United States Patent
Tsai et al.

(10) Patent No.: US 7,817,215 B2
(45) Date of Patent: Oct. 19, 2010

(54) DISPLAY PANEL AND PIXEL ELEMENT THEREOF

(75) Inventors: Ching-Yu Tsai, Hsinchu (TW); Ching-Huan Lin, Tainan Hsien (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 12/482,799

(22) Filed: Jun. 11, 2009

(65) Prior Publication Data

US 2009/0244417 A1    Oct. 1, 2009

Related U.S. Application Data

(63) Continuation of application No. 11/505,911, filed on Aug. 18, 2006, now Pat. No. 7,671,929.

(30) Foreign Application Priority Data

Dec. 30, 2005    (TW) .............................. 94147729 A

(51) Int. Cl.
  G02F 1/1343    (2006.01)
  G02F 1/1335    (2006.01)
(52) U.S. Cl. ........................ 349/38; 349/114
(58) Field of Classification Search ........................ None
  See application file for complete search history.

(56) References Cited

U.S. PATENT DOCUMENTS

| 6,262,783 | B1 * | 7/2001 | Tsuda et al. .................. 349/39 |
| 7,170,572 | B2 | 1/2007 | Sah et al. |
| 7,209,191 | B2 | 4/2007 | Chang |
| 7,463,327 | B2 * | 12/2008 | Tasaka et al. ............... 349/155 |
| 2005/0122452 | A1 * | 6/2005 | Yoshida et al. .............. 349/114 |
| 2005/0146835 | A1 * | 7/2005 | Hsu .......................... 361/303 |

FOREIGN PATENT DOCUMENTS

| JP | 7-159776 A | 6/1995 |
| TW | 557394 B | 10/2003 |
| TW | 594334 B | 6/2004 |

* cited by examiner

*Primary Examiner*—Michelle R Connelly Cushwa
(74) *Attorney, Agent, or Firm*—Birch, Stewart, Kolasch & Birch, LLP

(57) ABSTRACT

A pixel element includes a transistor, a pixel electrode and a storage capacitor. The transistor is a switch device of the pixel element. A data signal is applied to the pixel electrode by switching the transistor. The storage capacitor includes the first electrode and the second electrode. Several holes are formed on a surface of the first electrode. Therefore, layers disposed over the first electrode duplicate the shape of the holes, so that the layers have rough surfaces, for increasing the reflectivity.

19 Claims, 7 Drawing Sheets

DISPLAY PANEL AND PIXEL ELEMENT THEREOF

CROSS-REFERENCE TO RELATED APPLICATIONS

This application is a continuation application of U.S. patent application Ser. No. 11/505,911, filed Aug. 18, 2006 now U.S. Pat No. 7,671,929 and for which priority is claimed under 35 U.S.C. §120. This application claims priority to Application No.94147729 filed in Taiwan on Dec. 30, 2005 under 35 U.S.C. §119(a). The entire contents of all are hereby incorporated by reference

BACKGROUND OF THE INVENTION (1). Field of the Invention

The present invention relates to a structure of unit pixel, and more specifically to the structure of unit pixel that is used in a LTPS (low temperature poly silicon) TFT LCD panel and that has micro transflective ability.

(2). Description of the Prior Art

According to the technology for constructing a display device of today, an LCD (Liquid Crystal Display) device is generally preferred to due to its compact size and quick response in addition to its lower power consumption and low radiation. Therefore, the LCD device is widely used in many electronic devices.

Note that the LCD device itself is not a light emitting instrument, and requires a light source to illuminate the crystal display panel. Generally, the crystal display panel is disposed adjacent to a light emitting path of a backlight module so that the light beams emitted from the backlight reaches the crystal display panel after passing through the diffusing film, the light guide plate and the other optical films. By adjusting or altering the orientation of the liquid crystal molecules in the crystal display panel, the brightness or illumination of the images can be controlled. Such type of LCD device is generally known as transmissive-mode because the light beams can pass through all the films.

When the transmissive-mode LCD device is used outdoor, the image or text is not easily viewable since the environmental light (such as sunlight) may overwhelm the light beams coming from the backlight module .

There is still another type of LCD device, namely, transflective mode. The transflective mode LCD device includes a light reflective structure that substitutes the backlight module and that is capable of reflecting the external light beams back into the crystal display panel. thereby increasing the utilization of the light beams so as to enhance the display ability of the images.

When the transflective mode LCD device is used indoors, one may encounter the problem of insufficient of brightness or light, since the lighting indoor cannot provide sufficient illumination to the crystal display panel, thereby leading to blurring of the images or text.

In order to solve the aforesaid disadvantage, a half transflective mode LCD device has been proposed and the latter includes a crystal display panel including a pixel unit having transmissive and transflective regions simultaneously.

Referring to FIG. 1, a half transflective mode LCD device is shown to include a plurality of scanning lines 11 and a plurality of data lines 12 disposed on a lower base plate 10 in a cross manner so as to define a plurality of pixel units 13.

Each pixel unit 13 includes a pixel electrode 131 and a TFT 132. The TFT 132 is coupled to the respective scanning and data lines 11, 12 and serves as the switch for the pixel electrode 131.

Note that the pixel electrode 131 can be further divided into a transmissive electrode region 1311 and a transflective electrode region 1312. The transmissive electrode region 1311 is made from a metal material, such as ITO (In Ti Oxide) while the transflective electrode region 1312 is made from a metal material having high reflectivity, such as aluminum.

FIG. 2 illustrates a sectional view of a conventional LCD device. When the external light beams LI strikes the transflective electrode region 13 12 after passing through the upper base plate 14, the light beams L1 reflect back to the upper base plate 14 so as to illuminate the crystal display panel. The light beams L2 emitted from the backlight module 15 pass through the transmissive electrode region 1311 and cooperates with the reflected light beams L1 to illuminate the crystal display panel. Thus, the user can select another type of LCD device when purchasing the display device.

However, the reflected light beams coming back from the aforesaid transflective electrode region 1312 cannot satisfy the requirement of the user of today LCD device as the development in the LCD technology further progresses. Therefore, for those skilled in the art, it has become an urgent task to explore how to increase the reflectivity ability so as to provide magnificent brightness in the crystal display panel of the half transflective mode LCD device.

SUMMARY OF THE INVENTION

An objective of the present invention is to provide a pixel element further utilizing a region of a storage capacitor. Several micro-reflection structures are formed on a surface of the storage capacitor for increasing the reflectivity.

A pixel element of the present invention includes a transistor, a pixel element and a storage capacitor. The transistor mainly includes a channel layer, a source layer, a drain layer and a gate layer. The transistor is a switch device of the pixel element to control whether a data signal to be applied to the pixel electrode or not.

The storage capacitor at least includes two electrodes which can be named as the first electrode and the second electrode for storing electric charge. The second electrode made of material with high reflectivity is positioned over the first electrode. Several holes are formed on the first electrode. Therefore, during the manufacturing process, layers (such as the second electrode) has concaves according to the holes of the first electrode.

In other words, the surface of the storage capacitor is rough because of the holes of the first electrode so that the surface area to reflect light in the storage capacitor is increased.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In general, a liquid crystal display panel includes a filter substrate, an array substrate and a liquid crystal layer clamped between the filter substrate and the array substrate. A pixel array structure is manufactured by arranging several pixel elements on the array substrate.

Figure 1:
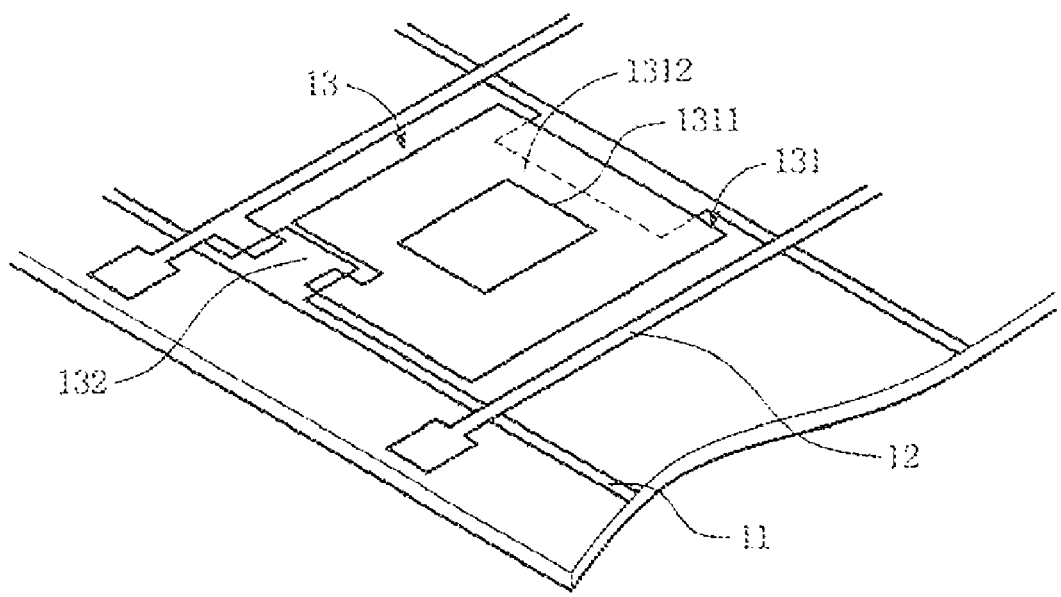
FIG. 1 is a cross-sectional view of a half transflective mode LCD device.
Figure 2:
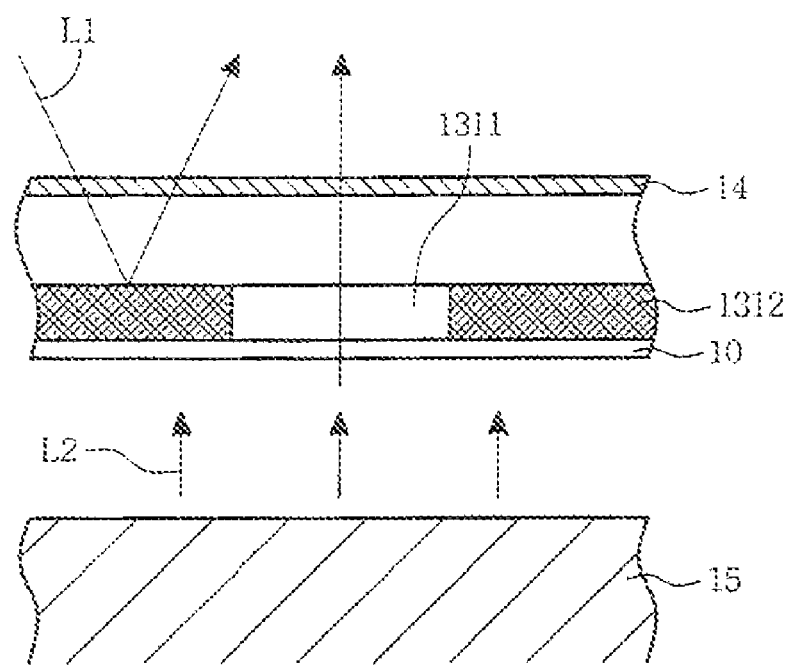
FIG. 2 illustrates a sectional view of a conventional LCD device.
Figure 3:
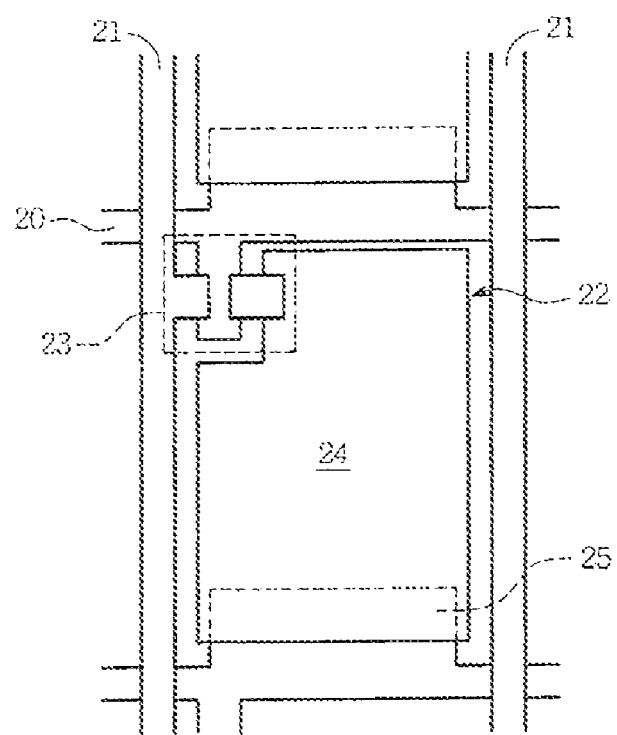
FIG. 3 illustrates a pixel element.

Please refer to FIG. 3. FIG. 3 illustrates a pixel element.

As shown in FIG. 3, several scan lines 20 and several data lines 21 are disposed on an array substrate. The scan lines 20 are arranged transversely while the data lines 21 are arranged longitudinally. Several pixel elements 22 can be defined by the scan lines 20 and the data lines 21. Each pixel element 22 includes a transistor 23, a pixel electrode 24 and a storage capacitor 25.

Each transistor 23 is a three-terminal device including a gate, a source and a drain. The transistor 23 is positioned at an intersection of the scan lines 20 and the data lines 21. The transistor 23 is coupled to the scan lines 20 and the data lines 21 respectively. The scan lines 20 are connected to the gate of the transistor 23. The data lines 21 are connected to the source of the transistor 23. Therefore, each transistor 23 serves as a switch device for one of the pixel elements 22. Through signals of the scan lines 20, the transistor 23 is controlled to be turned on or turned off for determining whether signals of the data lines 21 are applied to the pixel electrode 24 or not.

The pixel electrode 24 is connected to the drain of the transistor 23. The drain of the transistor 23 covers the main area of the pixel element 22. As stated above, through switching the transistor 23, the signals of the data lines 21 are applied to the pixel electrode 24 to control the electric field between the pixel electrode 24 and a common electrode. As a result, the rotation directions of liquid crystal molecules in the liquid crystal layer are changed.

Figure 4:
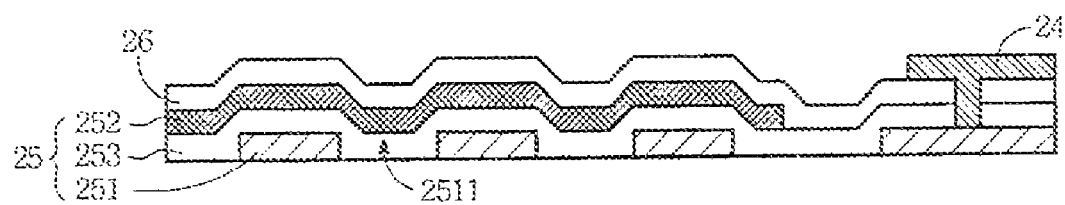
FIG. 4 is a cross-sectional view of the storage capacitor in the above pixel element according to the first embodiment of the invention.

Please refer to FIG. 4. FIG. 4 is a cross-sectional view of the storage capacitor 25 in the above pixel element according to the first embodiment of the invention. As shown in FIG. 4, the storage capacitor 25 includes the first electrode 251, the second electrode 252 and a capacitor insulation layer 253 between the first electrode 251 and the second electrode 252. The second electrode 252 is positioned over the first electrode 251. A transparent protecting layer or a dielectric layer 26 can be disposed over the second electrode 252 to protect these structures.

Furthermore, the second electrode 252 is made from material with high reflectivity. For example, the second electrode 252 can be made from aluminum material whose external surface is electrically coated with a layer of titanium. Meanwhile, there is no need to cover the portion of the filter substrate corresponding to the storage capacitor with a black matrix (BM) in the liquid crystal displayer. In other words, the storage capacity is exposed in a light-transmitting opening area.

Several holes 2511 are formed on a surface of the first electrode 251. As a result, the second electrode 252 positioned over the first electrode 251 duplicates the shapes of the hole 2511 so that the second electrode 252 has a rough surface. When the surface of the second electrode 252 is a rough surface with concaves, the second electrode 252 has more surface area to reflect light. Therefore, the reflectivity is increased greatly.

Moreover, the first electrode 251 is a part of the storage capacitor 25. Therefore, when the holes are formed, all parts of the first electrode 251 need to remain electrically connected. In general, the first electrode 251 is manufactured by vapor deposition. First, an electrically conductive material is deposited on the substrate. Then, several holes 2511 are etched on the first electrode 251. In a preferred embodiment, the holes 2511 are arranged on the first electrode 251 in an array.

Also, in the invention, the manufacture of the storage capacitor 25 can be combined with the manufacturing process of the transistor 23 without adding extra steps. For example, when the layers of the transistor 23 are manufactured, the first electrode 251 and the second electrode 252 are deposited at the same time. Therefore, there is no need to add extra manufacturing process. In other words, when the pixel element of the invention is applied to a low temperature poly silicon displayer, no extra manufacturing process is required. The first electrode 251 and the second electrode 252 are manufactured in the original manufacturing order.

Furthermore, when a poly silicon layer is formed on the substrate to be a channel layer of the transistor, another pattern of the poly silicon layer is also defined in a specific region of the pixel element to be the first electrode 251. That is to say, the first electrode 251 and the channel layer of the transistor are formed by the same poly silicon layer respectively.

Similarly, in the depositing and etching manufacturing processes of the layers. the second electrode 252 and the gate of the transistor are formed by the sane metal layer respectively. In an embodiment, the second electrode 252 is formed by a region extending from the scan line.

The capacitor insulation layer 253 positioned between the first electrode 251 and the second electrode 252. is formed by the same insulation layer as a gate insulation layer of the transistor.

A storage capacitor with two electrodes is illustrated in the above embodiment. However, the storage capacitor can further be composed of several electrodes separated by some capacitor insulation layers for increasing the capacitance of the storage capacitor. A storage capacitor with three electrodes according to another embodiment of the invention is illustrated as well.

Figure 5A:
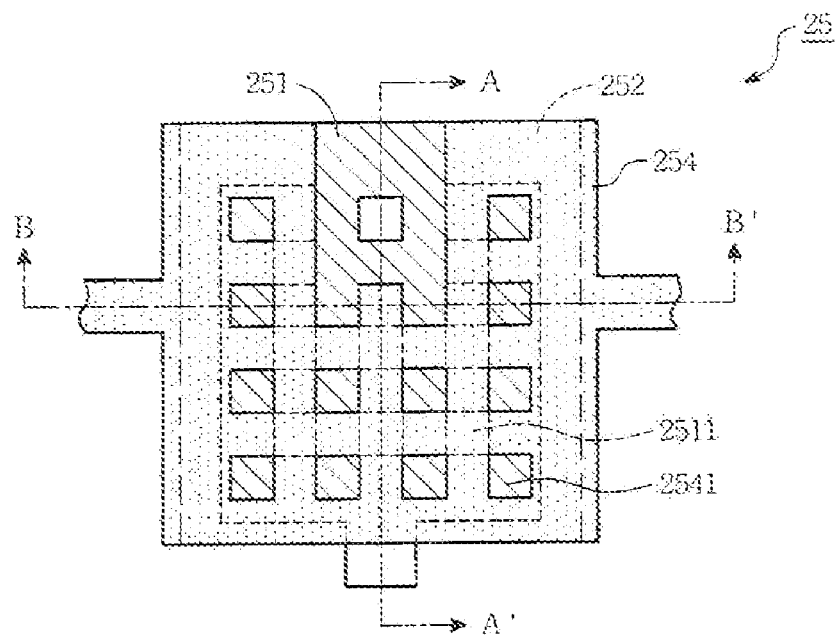
FIG. 5A illustrates the storage capacitor according the second embodiment of the invention.
Figure 5B:
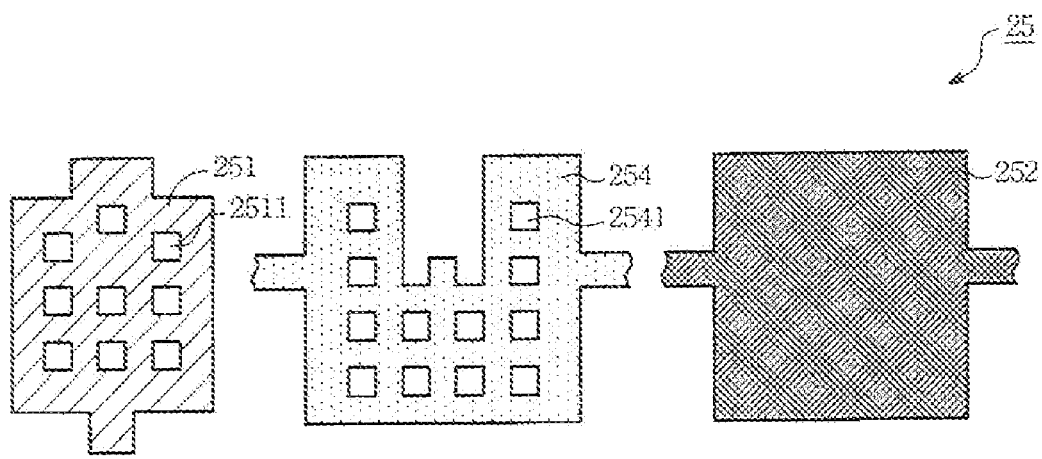
FIG. 5B shows the first electrode, the second electrode and the third electrode of the storage capacitor in FIG. 5A separately.
Figure 5C:
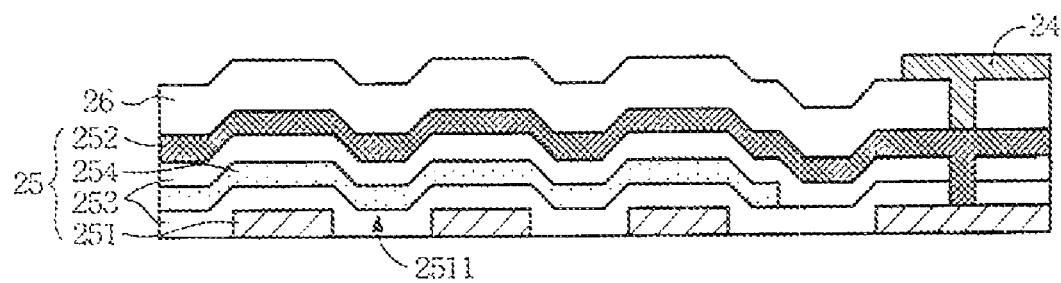
FIG. 5C is a cross-sectional view of the storage capacitor in FIG. 5A taken along a section line A-A'.

Please refer to FIG. 5A to FIG. 5C. FIG. 5A to FIG. 5C illustrate a storage capacitor according to the second embodiment of the invention. In the present embodiment, the storage capacitor includes the first electrode 251, the second electrode 252 and the third electrode 254.

Figure 5D:
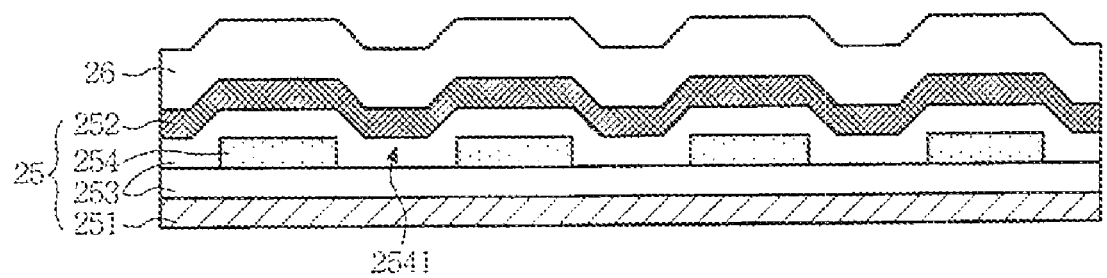
FIG. 5D is a sectional view of the storage capacitor in FIG. 5A taken along a section line B-B'.

FIG. 5A illustrates the storage capacitor according to the second embodiment of the invention (the second electrode 252 is positioned over the first electrode 251 and the third electrode 254 in order to show the first electrode 251 and the third electrode 254, the second electrode 252 is illustrated by dotted lines in FIG. 5A). FIG. 5B shows the first electrode 251, the second electrode 252 and the third electrode 254 of the storage capacitor 25 in FIG. 5A separately. FIG. 5C is a cross-sectional view of the storage capacitor 25 in FIG. 5A taken along a section line A-A'. FIG. 5D is a cross-sectional view of the storage capacitor 25 in FIG. 5A taken along a section line B-B'.

As shown in FIG. 5C and FIG. 5D, a dielectric material is formed between the first electrode 251 and the third electrode 254 to be a capacitor insulation layer 253. As a result, a capacitance effect occurs between the two electrodes to form a capacitor. The same dielectric material is formed between the third electrode 254 and the second 252 to be another capacitor insulation layer 253. Therefore, a capacitance effect occurs between the two electrodes to form a capacitor. In other words, the storage capacitor 25 is composed of the two capacitors.

In the present embodiment, the first electrode 251 is a poly silicon layer in the structure of the storage capacitor. A metal layer extending from one data line serves as the third electrode 254. When the source/drain is defined, the second electrode 252 is defined as well. In other words, the third electrode 254 is positioned between the first electrode 251 and the second electrode 252. The first electrode 251 is positioned under the third electrode 254.

Therefore, after several holes 2511 are formed on the surface of the first electrode 251, a dielectric material is deposited continuously on the first electrode 251 to be a capacitor insulation layer 253. Effected by the holes 2511, the capacitor insulation layer 253 is rough and has concaves. When the third electrode 254 is formed over the capacitor insulation layer 253, the third electrode 254 is also effected by the capacitor insulation layer 253. As a result, the third electrode 254 is rough and has concaves as well.

Similarly, when formed over the third electrode 254, the second electrode 252 is effected by the third electrode 254 to have concaves accordingly. Through the deposition of the layers, the second electrode 252 has a rough surface with concaves. The surface area to reflect light is increased. Therefore, the reflectivity is increased.

What is needed to be illustrated especially is that the above influence can be made by forming the holes 2511 only on the first electrode 251. As a result, the surface of the second electrode 252 has structures to reflect light. However, in order to enable the first electrode 251 to have electrical properties with other layers after the holes 2511 are formed, the area to form the holes 2511 is limited. In a preferred embodiment, the area to form the holes 2511 is not more than 25% of the area of the first electrode 251.

Therefore. in a preferred embodiment, several holes 2541 are also formed on the third electrode 254 as shown in FIG. 5B and FIG. 5D. The holes 2541 are arranged on the third electrode 254 in an array. Also, the position of the holes 2511 on the first electrode 251 does not overlap the holes 2541 on the third electrode 254. That is to say, when the holes 2511 of the first electrode 251 are projected vertically to the surface of the third electrode 254, the region that the holes 2511 of the first electrode are projected to the surface of the third electrode 254 is located besides the holes 2541 of the third electrode 254. More specifically speaking, when the center region in the middle of four adjacent holes 2511 arranged in an array on the first electrode 251 is projected vertically on the surface of the third electrode 254, the center region corresponds to one of the holes 2541 on the third electrode 254.

Therefore, the concaves resulted from the holes 2511 of the first electrode 251 and those resulted from the holes 2541 of the third electrode 254 are staggered. The second electrode 252 has concaves in different directions as shown in FIG. 5C and FIG. 5D. The area of the structure to reflect light can reach 50% of the total area, so that the reflectivity is increased greatly.

In the above embodiment, the first electrode 251 is a poly silicon layer. The third electrode 254 is a metal layer extending from one scan line. As a result, the first electrode 251 is positioned under the third electrode 254.

Figure 6A:
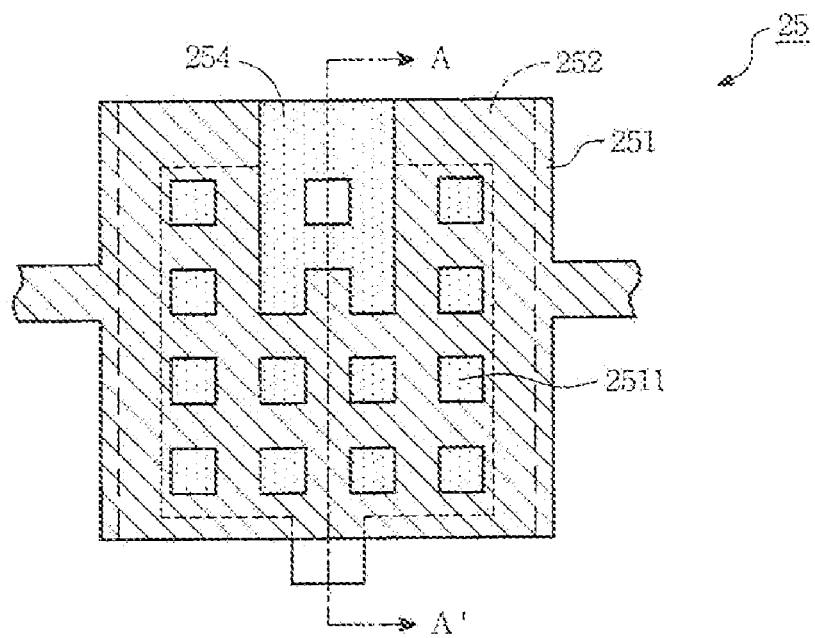
FIG. 6A illustrates the storage capacitor according to the third embodiment of the invention.
Figure 6B:
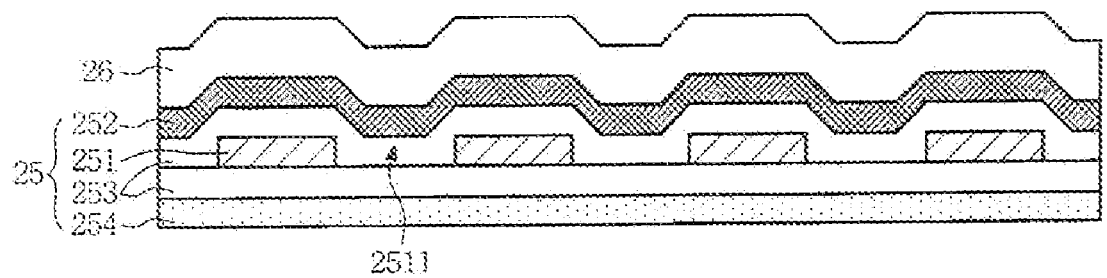
FIG. 6B is a cross-sectional view of the storage capacitor in FIG. 6A taken along a section line A-A'.

As to other embodiments, when the first electrode 251 and the third electrode 254 are not made from the same material as the above embodiment, the relative positions of the two electrodes can be different. FIG. 6A and FIG. 6B illustrate the storage capacitor 25 according to the third embodiment of the invention. The materials of the first electrode 251 and the third electrode 254 in the present embodiment are different from those in the above embodiments. The third electrode 254 and the channel layer of the transistor are formed by the same poly silicon layer respectively. The first electrode 251 and the gate of the transistor are formed by the same metal layer respectively. In other words, the first electrode 251 and the gate of the transistor are extension of the scan line. Therefore, the first electrode 251 is positioned over the third electrode 254. In the present embodiment, only the holes 2511 are formed on the First electrode 251.

When formed over the first electrode 251, the second electrode 252 is also effected by the holes 2511 of the first electrode 251. As a result, the second electrode 252 has a rough surface with concaves. Therefore, the reflectivity is increased.

Similarly, when the first electrode 251 is positioned over the third electrode 254, holes only need to be formed on the first electrode 251. As a result, the second electrode 252 covering over the first electrode 251 has better reflectivity. However, several holes can also be formed on the third electrode 254. Additionally, the holes 2511 of the first electrode 251 and those of the third electrode 254 are staggered similarly so that the second electrode 252 has more concaves. The arrangement of the holes is not described redundantly.

In the above embodiments, a storage capacitor over scan lines (Cst on Gate) is illustrated. Of course, the invention can also be applied to a storage capacitor over common lines (Cst on Common). When the storage capacitor is composed of two electrodes, the first electrode can be a poly silicon layer, and the second electrode can be a common line. In the following embodiment, a storage capacitor with three electrodes is illustrated.

Figure 7:
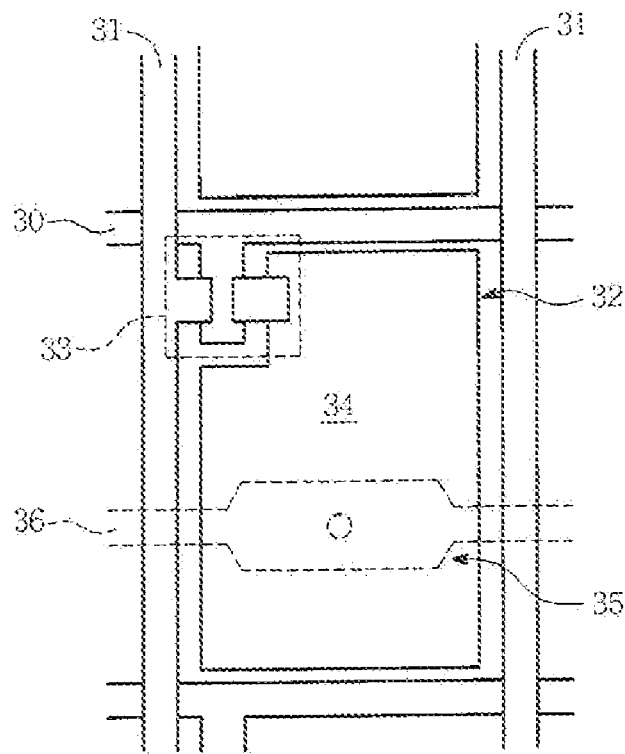
FIG. 7 illustrates a Cst on common pixel element.

Please refer to FIG. 7. FIG. 7 illustrates a Cst on common pixel element.

As shown in FIG. 7, several transversely parallel scan lines 30 are disposed on an array substrate. Several longitudinally parallel data lines 31 are disposed on the array substrate as well. Several pixel elements 32 are defined by the scan lines 30 and the data lines 31. Moreover, several common lines 33 are disposed on the array substrate. Each pixel element 32 includes a transistor 33, a pixel electrode 34 and a storage capacitor. As shown in FIG. 7, there is one common line 33 passing through each pixel element 32. The difference between the present embodiment and the above ones is that the first electrode and the third electrode are formed by the common line and the bottom of the poly silicon layer respectively in the Cst on Common storage capacitor 35.

Figure 8A:
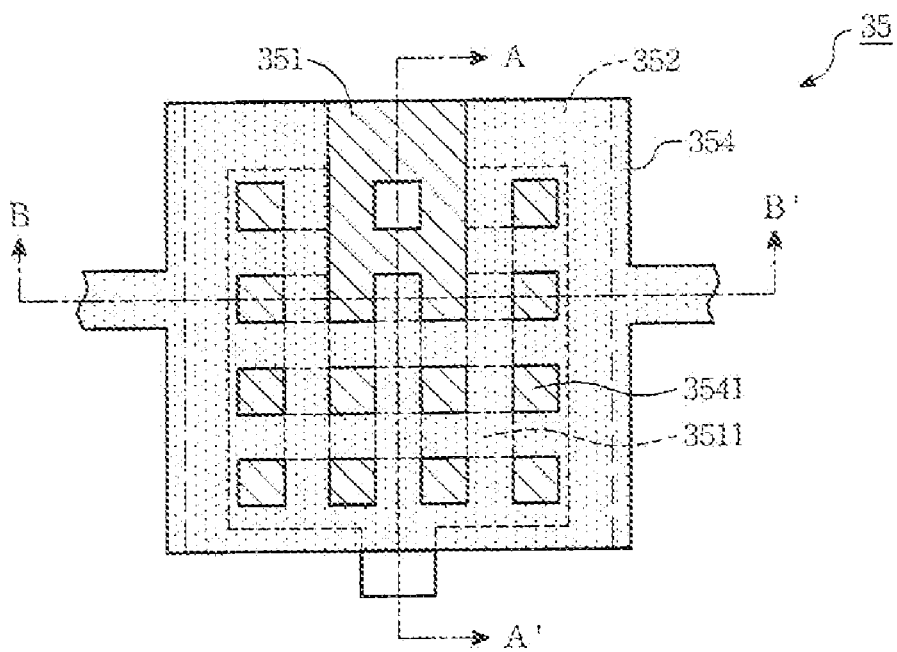
FIG. 8A illustrates the storage capacitor according to the fourth embodiment of the invention.
Figure 8B:
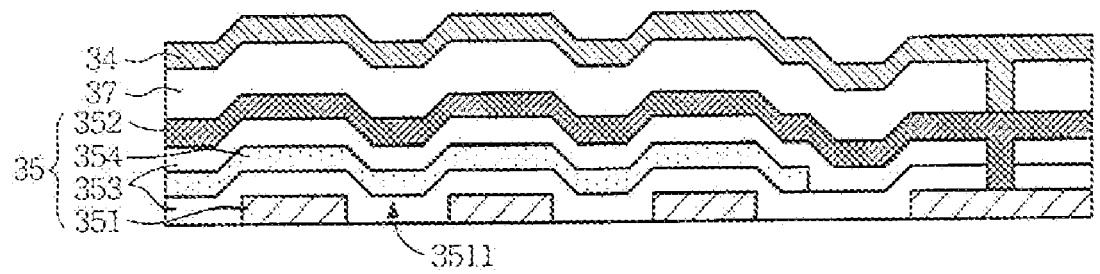
FIG. 8B is a cross-sectional view of the storage capacitor in FIG. 7 taken along a section line A-A'.
Figure 8C:
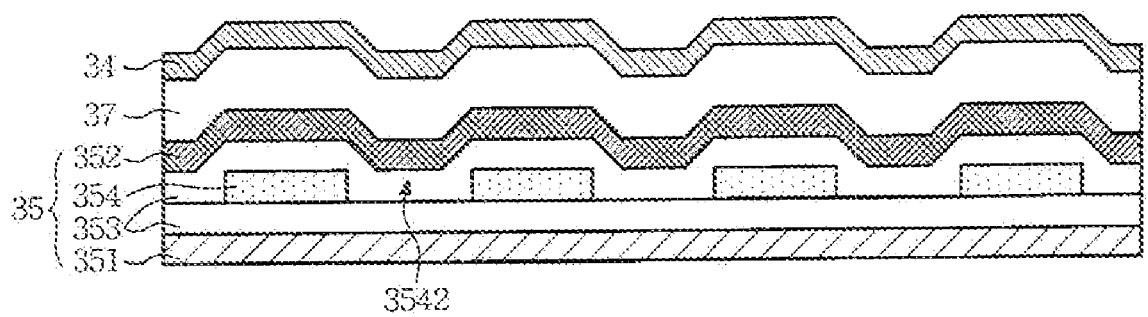
FIG. 8C is a cross-sectional view of the storage capacitor in FIG. 7 taken along a section line B-B'.

Please refer to FIG. 8A~FIG. 8C. FIG. 8A illustrates the storage capacitor 35 in FIG. 7. FIG. 8B is a cross-sectional view of the storage capacitor 35 in FIG. 7 taken along a section line A-A'. FIG. 8C is a cross-sectional view of the storage capacitor 35 in FIG. 7 taken along a section line B-B'.

In the present embodiment, the storage capacitor 35 includes the first electrode 351, the second electrode 352, capacitor insulation layers 353 between the electrodes, the third electrode 354 and a protecting layer 37 covering over the storage capacitor 35.

In the present embodiment, the first electrode 351 is a poly silicon layer. A metal layer of the common line serves as the third electrode 354. When a gate/drain is manufactured, the second electrode 352 is defined by the same metal layer. In other words, the first electrode 351 is positioned under the third electrode 354. The third electrode 354 is positioned between the first electrode 351 and the second electrode 352.

Also, several holes 3511 are formed on the first electrode 351 so that the third electrode 354 deposited over the first electrode 351 has a rough surface. Several holes 3541 are also formed on the third electrode 354. The holes 3541 of the third electrodes 354 and the holes 3511 of the first electrode 351 are staggered. In the present embodiment, as shown in FIG. 8B and FIG. 8C respectively, the second electrode 352 has concaves in different directions. Therefore, the reflectivity is increased greatly.

Of course, the first electrode 351 can be positioned over the third electrode 354 in other embodiments. In other words, the third electrode 354 is formed by a poly silicon layer first. Then, when the common line is manufactured, the common line is used as the first electrode 351. And both the first electrode 351 and the third electrode 354 are used for storing electric charge. Additionally, the holes can only be formed on the first electrode 351 so that the second electrode 352 deposited over the first electrode 351 has a rough surface.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

We claim:

1. A pixel element applied to a display panel, the pixel element, comprising:
    a transistor;
    a pixel electrode;
    a storage capacitor having a first electrode and a second electrode, wherein a plurality of holes are formed on a surface of the first electrode, the second electrode positioned over the first electrode duplicating the shape of the holes so that the second electrode has a rough surface for increasing reflectivity; and
    a common line, wherein the first electrode and a channel layer of the transistor are formed by the same poly silicon layer respectively, the common line being used as the second electrode.

2. The pixel element of claim 1, wherein the holes are arranged on the first electrode in an array.

3. The pixel element of claim 1, wherein the storage capacitor further includes a third electrode.

4. The pixel element of claim 3, wherein the third electrode has a plurality of holes arranged in an array.

5. The pixel element of claim 4, wherein a center region in the middle of four adjacent holes arranged in an array on the first electrode is vertically projected to one of the holes on the third electrode.

6. The pixel element of claim 4, wherein a region that the holes of the first electrode are projected vertically to the surface of the third electrode is located besides the holes of the third electrode.

7. The pixel element of claim 3, wherein the third electrode is positioned between the first electrode and the second electrode.

8. The pixel element of claim 3, wherein the third electrode is positioned under the first electrode.

9. The pixel element of claim 3 further comprising a capacitor insulation layer positioned between the first electrode and the third electrode, the capacitor insulation layer and a gate insulation layer being formed by the same insulation layer respectively.

10. A display panel including a pixel array structure having a plurality of pixel elements, each pixel element comprising:
    a transistor;
    a pixel electrode;
    a storage capacitor comprising a first electrode and a second electrode, wherein a plurality of holes are formed on a surface of the first electrode, the second electrode positioned over the first electrode duplicating the shape of the holes of the first electrode so that the second electrode has a rough surface for increasing reflectivity; and
    a common line, the first electrode and a channel layer of the transistor being formed by the same poly silicon layer respectively, the common line being used as the second electrode.

11. The display panel of claim 10, wherein the holes are arranged on the first electrode in an array.

12. The display panel of claim 10, wherein the pixel element further includes

13. The display panel of claim 10, wherein the storage capacitor further includes a third electrode.

14. The display panel of claim 13, wherein a plurality of holes are arranged in an array and are formed on the third electrode.

15. The display panel of claim 14, wherein a center region in the middle of four adjacent holes of the first electrode is projected vertically to one of the holes of the third electrode.

16. The display panel of claim 14, wherein a region that the holes of the first electrode are projected vertically to the surface of the third electrode is located besides the holes of the third electrode.

17. The display panel of claim 13, wherein the third electrode is positioned between the first electrode and the second electrode.

18. The display panel of claim 13, wherein the third electrode is positioned under the first electrode.

19. The display panel of claim 13 further comprising a capacitor insulation layer positioned between the first electrode and the third electrode, the capacitor insulation layer and a gate insulation layer of the transistor being formed by the same insulation layer respectively.

* * * * *